United States Patent
Franz

[15] 3,674,802
[45] July 4, 1972

[54] 2-ACYL-4-ACYLOXY-2,3,4,5-TETRAHYDRO-1,2,4-OXADIAZOLES

[72] Inventor: John E. Franz, Crestwood, Mo. 63126

[73] Assignee: Monsanto Company, St. Louis, Mo.

[22] Filed: Jan. 5, 1970

[21] Appl. No.: 841

[52] U.S. Cl. ..........................260/307 F, 71/92, 260/240 K
[51] Int. Cl. ...........................................C07d 85/52
[58] Field of Search...................................260/307 F, 240 K

[56] References Cited

UNITED STATES PATENTS 3,250,781  5/1966  Zimmt...................................260/307

Primary Examiner—Alex Mazel
Assistant Examiner—R. V. Rush
Attorney—Paul C. Krizov, Neal E. Willis and David D. Centola

[57] ABSTRACT

2-Acyl-4-acyloxy-2,3,4,5-tetrahydro-1,2,4-oxadiazoles are described herein. These compounds find utility as herbicides. For example, 2-(parachlorobenzoyl)-2,3,4,5-tetrahydro-1,2,4-oxadiazole-4-yl-parachlorobenzoate and its herbicidal properties are disclosed herein.

5 Claims, No Drawings

2-ACYL-4-ACYLOXY-2,3,4,5-TETRAHYDRO-1,2,4-OXADIAZOLES

This invention relates to novel 2-acyl-4-acyloxy-2,3,4,5-tetrahydro-1,2,4-oxadiazoles. These novel compounds possess utility as herbicides.

An object of this invention is to provide novel herbicidal compositions. Another object is to provide methods for the modification and control of plant growth. Still a further object is to provide novel 2-acyl-4-acyloxy-2,3,4,5-tetrahydro-1,2,4-oxadiazoles. These and other objects will be apparent from a consideration of the accompanying disclosure and the appended claims.

In accordance with this invention, it has been discovered that compounds of the formula

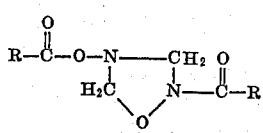

wherein R is selected from the group consisting of alkyl having at least one and a maximum of six carbon atoms, cycloalkyl having at least three and a maximum of four carbon atoms, phenylalkyl having at least seven and a maximum of eight carbon atoms, phenylalkenyl having at least eight and a maximum of nine carbon atoms, furanyl, and a substituted phenyl of the formula

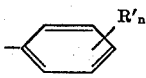

wherein R' is selected from the group consisting of alkoxy having at least one and a maximum of six carbon atoms, alkyl having at least one and a maximum of six carbon atoms, nitro, and halogen; and $n$ is an integer from 0 through 4, have valuable post-emergent herbicidal activity.

A preferred embodiment of this invention encompasses those compounds wherein R is selected from the group consisting of alkyl having at least one and a maximum of three carbon atoms, cyclopropyl, benzyl, phenethenyl, furan, and a substituted phenyl of the formula

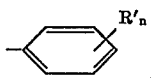

wherein R' is selected from the group consisting of alkoxy having at least one and a maximum of three carbon atoms, alkyl having at least one and a maximum of three carbon atoms, nitro, and halogen; and $n$ is an integer from 0 through 2.

A more preferred embodiment of this invention encompasses those compounds wherein R is selected from the group consisting of methyl, cyclopropyl, benzyl, phenethenyl, furanyl, and a substituted phenyl of the formula

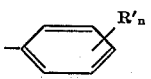

wherein R' is selected from the group consisting of alkoxy having at least one and a maximum of two carbon atoms, alkyl having at least one and a maximum of two carbon atoms, nitro, and halogen; and $n$ is an integer from 0 through 2.

The compounds of this invention may, in general, be prepared by reacting a polyformaldehyde oxime of the formula

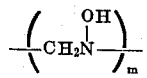

with an acid chloride of the formula

wherein R is as previously defined, and $m$ is an integer from 1 to 100. The reaction can conveniently be carried out in an inert organic solvent such as methylene chloride, chloroform, benzene, chlorobenzene, carbon disulfide, nitromethane, nitrobenzene and the like, the preferred solvent being methylene chloride. In general, good results are obtained by reacting substantially equimolecular proportions of the polyformaldehyde oxime and the acid chloride. The reaction may be conducted in a temperature range of from about 20°C to about 100°C. In the preferred method of operation, the reaction is conducted at a temperature range of 50°C to 70°C, with refluxing. The reaction mixture is then maintained in said temperature range for a period of about 4 hours to about 30 hours, the period of time being dependent upon the acid chloride used and temperature employed.

Suitable acid chlorides for the practice of this invention are p-chlorobenzoyl chloride, 2,4-dichlorobenzoyl chloride, 3,4-dichlorobenzoyl chloride, m-nitrobenzoyl chloride, 3,5-dinitrobenzoyl chloride, p-fluorobenzoyl chloride, o-fluorobenzoyl chloride, p-methoxybenzoyl chloride, benzoyl chloride, acetyl chloride, propionoyl chloride, hexanoyl chloride, isopropionoyl chloride, sec-butanoyl chloride, t-butanoyl chloride, pivaloyl chloride, 2,4,6-trimethylbenzoyl chloride, p-methylbenzoyl chloride, 2,4- dimethylbenzoyl chloride, p-ethylbenzoyl chloride, 2,4-diethylbenzoyl chloride, 2,4-di-t-butylbenzoyl chloride, 2,4-dimethoxybenzoyl chloride, 2,4-dibromobenzoyl chloride, 2,4-diiodobenzoyl chloride, cyclopropyl carbonyl chloride, cinnamoyl chloride, and the like.

The following examples illustrate the present invention and are not to be construed as limiting. Parts are by weight unless otherwise stated.

EXAMPLE I 2-(p-chlorobenzoyl)-2,3,4,5-tetrahydro-1,2,4-oxadiazole-4-yl p-chlorobenzoate was prepared by the following procedure A suitable vessel equipped with heating means and refluxing means, was charged with 5 parts of polyformaldehyde oxime, 17.5 parts of p-chlorobenzoyl chloride, and 72 parts of methylene chloride. The resulting mixture was refluxed for about 19 hours, and cooled to room temperature, yielding a white precipitate. The white precipitate was filtered off and the filtrate diluted with ether, and allowed to stand overnight at room temperature, then cooled in an icebath, yielding a white crystalline solid. The white crystalline solid which was recrystallized from benzene, melted at 153°C to 153.5°C, and was identified by IR and Mass Spectrometry as 2-(p-chlorobenzoyl)-2,3,4,5-tetrahydro-1,2,4-oxadiazole-4-yl p-chlorobenzoate.

Analysis for $C_{16}H_{12}Cl_2N_2O_4$:
Calc'd: C,52.31; H,3.27N, 7.67; Cl, 19.43
Found: C,52.48; H,3.13N, 7.67; Cl, 19.17

Other examples of compounds prepared are:
2. 2-(2,4-dichlorobenzoyl)-2,3,4,5-tetrahydro-1,2,4-oxadiazole-4-yl-(2,4-dichlorobenzoate)
3. 2-(3,4-dichlorobenzoyl)-2,3,4,5-tetrahydro-1, 2,4-oxadiazole-4-yl-(3,4-dichlorobenzoate)
4. 2-(p-nitrobenzoyl)-2,3,4,5-tetrahydro-1,2,4-oxadiazole-4-yl-(p-nitrobenzoate)
5. 2-(3,5-dinitrobenzoyl)-2,3,4,5-tetrahydro-1,2,4-oxadiazole-4-yl-(3,5-dinitrobenzoate)
6. 2-(p-fluorobenzoyl)-2,3,4,5-tetrahydro-1,2,4-oxadiazole-4-yl-(p-fluorobenzoate)
7. 2-(o-fluorobenzoyl)-2,3,4,5-tetrahydro-1,2,4-oxadiazole-4-yl-(o-fluorobenzoate)
8. 2-(p-hexoxybenzoyl)-2,3,4,5-tetrahydro-1,2,4-oxadiazole-4-yl-(p-hexoxybenzoate)
9. 2-benzoyl-2,3,4,5-tetrahydro-1,2,4-oxadiazole-4-yl-benzoate
10. 2-acetoyl-2,3,4,5-tetrahydro-1,2,4-oxadiazole-4-yl-acetate 11. 2-propionoyl-2,3,4,5-tetrahydro-1,2,4-oxadiazole-4-yl-propionate
12. 2-hexanoyl-2,3,4,5-tetrahydro-1,2,4-oxadiazole-4-yl-hexanoate
13. 2-isopropionoyl-2,3,4,5-tetrahydro-1,2,4-oxadiazole-4-yl-isopropionate
14. 2-sec-butanoyl-2,3,4,5-tetrahydro-1,2,4-oxadiazole-4-yl-sec-butanoate
15. 2-t-butanoyl-2,3,4,5-tetrahydro-1,2,4-oxadiazole-4butanoate
16. 2-pivaloyl-2,3,4,5-tetrahydro-1,2,4-oxadiazole-4-yl-pivaloate
17. 2-(2,4,6-trimethylbenzoyl)-2,3,4,5-tetrahydro-1,2,4-oxadiazole-4-yl (2,4,6-trimethylbenzoate)
18. 2-(p-methylbenzoyl)-2,3,4,5-tetrahydro-1,2,4-oxadiazole-4-yl-(p-methylbenzoate)
19. 2-(2,4-dimethylbenzoyl)-2,3,4,5-tetrahydro-1,2,4-oxadiazole-4-yl-(2,4-dimethylbenzoate)
20. 2-(p-ethylbenzoyl)-2,3,4,5-tetrahydro-1,2,4-oxadiazole-4-yl-(p-ethylbenzoate)
21. 2-(2,4-diethylbenzoyl)-2,3,4,5-tetrahydro-1,2,4-oxadiazole-4-yl-(2,4-diethylbenzoate)
22. 2-(2,4-t-butylbenzoyl)-2,3,4,5-tetrahydro-1,2,4-oxadiazole-4-yl-(2,4-t-butylbenzoate)
23. 2-(2,4-dimethoxybenzoyl)-2,3,4,5-tetrahydro-1,2,4-oxadiazole-4-yl-(2,4-dimethoxybenzoate)
24. 2-(2,4-dibromobenzoyl)-2,3,4,5-tetrahydro-1,2,4-oxadiazole-4-yl-(2,4-dibromobenzoate)
25. 2-(2,4,6,-trichlorobenzoyl)-2,3,4,5-tetrahydro-1,2,4-oxadiazole-4-yl-(2,4,6-trichlorobenzoate)
26. 2-(2,3,5,6-tetrachlorobenzoyl)-2,3,4,5-tetrahydro-1,2,4-oxadiazole-4-yl-(2,3,5,6-tetrachlorobenzoate)
27. 2-(2,4,6-tribromobenzoyl)-2,3,4,5-tetrahydro-1,2,4-oxadiazole-4-yl-(2,4,6-tribromobenzoate)
28. 2-(2,4,6-triiodobenzoyl)-2,3,4,5-tetrahydro-1,2,4-oxadiazole-4-yl-(2,4,6-triiodobenzoate)
29. 2-cyclopropyl carbonyl-2,3,4,5-tetrahydro-1,2,4-oxadiazole-4-yl-cyclopropionate.
30. 2-cinnamoyl-2,3,4,5-tetrahydro-1,2,4-oxadiazole-4-yl-cinnamoate.

The compounds of this invention possess herbicidal activity as illustrated by the following examples.

EXAMPLE 31

A good grade of top soil is placed in aluminum pans and compacted to a depth of three-eighth inch to one-half inch from the top of each pan. A predetermined number of seeds of each of several plant species are placed on top of the soil in the pans. The seeds are covered with a three-eighth inch layer of prepared soil, and the pan leveled. The seed-containing pans are placed on a wet sand bench and maintained for approximately 14 days under ordinary conditions of sunlight and watering. The herbicidal sprays in acetone-water solutions containing 0.5 percent by weight of the active ingredient is then applied to the plant. The treated plants are placed in a greenhouse and the effects are observed and recorded approximately 14 days thereafter.

The post-emergent herbicidal activity index used in this example is based on the average percent injury of each plant species, and is defined as follows:

| Numerical Scale | Herbicidal Activity |
|---|---|
| 0 | No herbicidal activity |
| 1 | Slight herbicidal activity |
| 2 | Moderate herbicidal activity |
| 3 | Severe herbicidal activity |
| 4 | Plant is dead |

The observed data is set forth in the following table wherein the botanical type is identified by an initial in accordance with the following code:

A — Morning Glory  E — Radish  I — Pig Weed
B — Wild Oats  F — Sugar Beets  J — Soybean
C — Brome Grass  G — Foxtail  K — Wild Buckwheat
D — Rye Grass  H — Crab Grass  L — Tomato
 M — Sorghum

TABLE 1

| Compound | Contact Conc. % | Post-Emergent Herbicidal Activity Plant Species | | | | | | | | | | | | |
|---|---|---|---|---|---|---|---|---|---|---|---|---|---|
| | | A | B | C | D | E | F | G | H | I | J | K | L | M |
| 2-(p-chlorobenzoyl)-2,3,4,5-tetrahydro-1,2,4-oxadiazole-4-yl-p-chlorobenzoate | 0.5% | 1 | 2 | 1 | 1 | 1 | 1 | 1 | 2 | 1 | | 2 | 2 | 2 |
| 2-(p-nitrobenzoyl)-2,3,4,5-tetrahydro-1,2,4-oxadiazole-4-yl-(p-nitrobenzoate) | 0.5% | 1 | 0 | 0 | 0 | 1 | 1 | 1 | — | 4 | 1 | 1 | 1 | 0 |

For the sake of brevity and simplicity, the term "active ingredient" as used in the specification is used to describe the previously defined compounds of this invention.

The herbicidal compositions of this invention comprise an active ingredient and one or more herbicidal adjuvants which can be solid or liquid extenders, carriers, diluents, conditioning agents and the like. Preferred herbicidal compositions containing the active ingredients of this invention have been developed so that the active ingredients can be used to the greatest advantage to modify the growth of plant systems in soil. The preferred compositions comprise wettable powders, aqueous suspensions, dust formulations, emulsifiable oils and solutions in solvents. In general these preferred compositions can all contain one or more surface-active agents.

Surface-active agents which can be used in the herbicidal compositions of this invention are set out, for example in Searle, U.S. Pat. No. 2,426,417, Todd, U.S. Pat. No. 2,655,447, Jones U.S. Pat. No. 2,412,510 and Lenher, U.S. Pat. No. 2,139,276. In general less than 15 parts by weight of the surface active agent is present per 100 parts by weight of the herbicidal composition.

Wettable powders are water-dispersible compositions containing one or more active ingredients, an inert solid extender, and one or more wetting and dispersing agents. The inert solid extenders are usually of mineral origin such as the natural clays, diatomaceous earth and synthetic minerals derived from silica and silicate. Examples of such extenders include kaolinites, attapulgite clay and synthetic magnesium silicate.

Preferred wetting agents are alkyl benzene and alkyl naphthalene sulfonates, sulfated fatty alcohols, long chain acid esters of sodium isothionate, esters of sodium sulfosuccinate, sulfated or sulfonated fatty acid esters, petroleum sulfonates, sulfonated vegetable oils and ditertiary acetylinic glycols. Preferred dispersants are methyl cellulose, polyvinyl alcohol, sodium lignin sulfonates, polymeric alkyl naphthalene sulfonates, sodium naphthalene sulfonate, polymethylene bisnaphthalenesulfonate and sodium N-methyl-N- (long chain acid) taurates.

The wettable powders compositions of this invention usually contain from about 5 to about 95 parts of active ingredient, from about 0.25 to about 3.0 parts of wetting agent, from about 0.25 to about 7 parts of dispersant and from about 4.5 to about 94.5 parts of inert solid extender, all parts being by weight of the total composition. Where required from about 0.1 to 2.0 parts by weight of the solid inert extender can be replaced by a corrosion inhibitor or anti-foaming agent or both.

Aqueous suspensions are usually prepared by mixing together an aqueous slurry of water-insoluble active ingredient in the presence of dispersing agents to obtain a concentrated slurry of very finely divided particles. The resulting concentrated aqueous suspension is characterized by its extremely small particle size, so that when diluted and sprayed coverage is very uniform.

Dusts are dense finely divided particulate compositions which are intended for application to the soil in dry form. Dusts are characterized by their free flowing and rapid settling properties so that they are not readily wind-borne to areas where they are of no value. Dusts contain primarily an active ingredient and a dense, free flowing, finely divided particulate extender. However, their performance is sometimes aided by the inclusion of a wetting agent such as those listed hereinbefore under wettable powder compositions and convenience in manufacture frequently demands the inclusion of an inert, absorptive grinding aid. Suitable classes of grinding aids are natural clays, diatomaceous earth and synthetic minerals derived from silica or silicate. Preferred grinding aids include attapulgite clay, diatomaceous silica, synthetic fine silica and synthetic calcium and magnesium silicates.

The inert finely divided solid extender for the dusts can be of vegetable or mineral origin. The solid extenders are characterized by possessing relatively low surface areas and are poor in liquid absorption. Suitable inert solid extenders for herbicidal dusts include micaceous talcs, pyrophyllite, dense kaolin clays, ground calcium phosphate rock and tobacco dust. The dusts usually contain from about 0.5 to 99 parts active ingredient, 0 to 50 parts grinding aid, 0 to 3 parts wetting agent and 1 to 99.5 parts dense solid extender, all parts being by weight based on the total weight of the dust.

The wettable powders described above may also be used in the preparation of dusts. While such wettable powders could be used directly in dust form, it is more advantageous to dilute them by blending with the dense dust diluent. In this manner, dispersing agents, corrosion inhibitors, and anti-foam agents may also be found as components of a dust.

Emulsifiable oils are usually solutions of active ingredient in water-immiscible solvents together with a surfactant. Suitable solvents for the active ingredient of this invention include most hydrocarbons, except heptane, and most esters and ketones. Suitable surfactants are anionic, cationic and nonionic such as alkyl aryl polyethoxy alcohols, alkyl and alkyl aryl polyether alcohols, polyethylene sorbitol or sorbitan fatty acid esters, polyethylene glycol fatty esters, and oil soluble petroleum sulfonates or mixtures thereof. The emulsifiable oil compositions generally contain from about 5 to 95 parts active ingredient, about 1 to 10 parts surfactant and about 4 to 94 parts solvent, all parts being by weight based on the total weight of emulsifiable oil.

The herbicidal compositions of this invention can also contain other additaments, for example, fertilizers, other herbicides, pesticides and the like, used as adjuvant or in combination with any of the above-described adjuvants.

The compounds of this invention may be used in combination with known herbicides in order to provide enhanced biological effectiveness. The use of various herbicides in combination at the time of a single application or sequentially is common in practice. Herbicides which may be used in combination with the compounds of this invention include but are not limited to: substituted phenoxyaliphatic acids such as 2,4-dichlorophenoxyacetic acid; 2,4,5-trichlorophenoxyacetic acid, 2-methyl-4-chlorophenoxyacetic acid and the salts, esters and amides thereof; triazine derivatives, such as 2-chloro-4-ethylamino-6-isopropyl-amino-s-triazine; 2,4-bis(isopropylamino)-6-methoxy-s-triazine and 2-methylmercapto-4,6-bis(isopropylamino)-s-triazine; urea derivatives such as 3-(3,4-dichlorophenyl)-1,1-dimethylurea and 3-(m-trifluoromethylphenyl)-1,-1-dimethylurea and 3-(3,4-dichloro-phenyl)-1-methoxy-1-methylurea; pyridylium derivatives such as 1:1'-ethylene-2,2-dipyridylium dihalide; acetanilides such as N-isopropyl-alpha-chloroacetanilide, and 2-chloro-2', 6'-diethyl-N-methoxymethyl acetanilide; acetamides such as N,N-diallyl-alpha-chloroacetamide, carbamates such as ethyl-N,N-di-n-propylthiol carbamate, and 2,3-dichloroallyl diisopropylthiolcarbamate; substituted uracils such as 5-bromo-3-sec-butyl-6-methyluracil, substituted anilines such as N,N-dipropyl-alpha, alpha, alpha-trifluoro-2,6-dinitro-p-toluidine; pyridazone derivatives such as 5-amino-4-chloro-2-phenyl-3-(2H)-pyridazinone, and the like.

Fertilizers useful in combination with the active ingredients include, for example ammonium nitrate, urea and superphosphate. Other useful additaments include materials in which plant organisms take root and grow such as compost, manure, humus, sand and the like.

When operating in accordance with the present invention, effective amounts of the compounds of this invention are dispersed on the plant in any convenient fashion. The application of liquid and particulate solid herbicidal compositions to the plant can be carried out by conventional methods, e.g., power dusters, boom and hand sprayers and spray dusters.

In foliar treatment for the control or modification of vegetative growth, the active ingredients are applied in amounts from about 1 to about 50 or more pounds per acre. It is believed that one skilled in the art can readily determine from this specification, including examples, the application rate for any specific situation.

While the illustrative embodiments of the invention have been described hereinbefore with particularity, it will be understood that various other modifications will be apparent to and can readily be made by those skilled in the art without departing from the scope and spirit of the invention. Accordingly, it is not intended that the scope of the claims appended hereto be limited to the examples and description set forth herein but rather the claims be construed as encompassing all the features of patentable novelty which reside in the present invention including all features which would be treated as equivalents thereof by those skilled in the art to which the invention pertains.

What is claimed is:

1. A compound of the formula

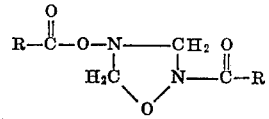

wherein each R represents the same moiety and is selected from the group consisting of alkyl having at least one and a maximum of six carbon atoms, cycloalkyl having at least three and a maximum of four carbon atoms, phenylalkyl having at least seven and a maximum of eight carbon atoms, phenylalkenyl having at least eight and a maximum of nine carbon atoms, and a substituted phenyl of the formula

wherein R' is selected from the group consisting of alkoxy having at least one and a maximum of six carbon atoms, alkyl having at least one and a maximum of six carbon atoms, nitro, and halogen; and $n$ is an integer from 0 through 4.

2. A compound in accordance with claim 1 wherein R is selected from the group consisting of alkyl having at least one and a maximum of three carbon atoms, cyclopropyl, benzyl, phenethenyl, and a substituted phenyl of the formula

wherein R' is selected from the group consisting of alkoxy having at least one and a maximum of three carbon atoms, alkyl having at least one and a maximum of three carbon atoms, nitro, and halogen; and $n$ is an integer from 0 through 2.

3. A compound in accordance with claim 2 wherein R is selected from the group consisting of methyl, cyclopropyl, benzyl, phenethenyl, and a substituted phenyl of the formula

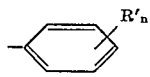

wherein R' is selected from the group consisting of alkoxy having at least one and a maximum of two carbon atoms, alkyl having at least one and a maximum of two carbon atoms, nitro, and halogen; and $n$ is an integer from 0 through 2.

4. A compound having the formula

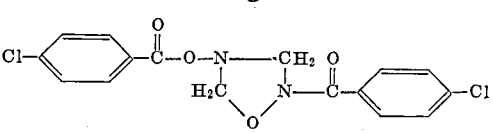

5. A compound having the formula

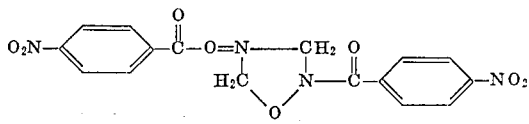

* * * * *